United States Patent
Cha et al.

(10) Patent No.: US 8,046,363 B2
(45) Date of Patent: Oct. 25, 2011

(54) SYSTEM AND METHOD FOR CLUSTERING DOCUMENTS

(75) Inventors: Wan Kyu Cha, Kyunggi-do (KR); Jeong Joong Kim, Seoul (KR); Han Joon Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 337 days.

(21) Appl. No.: 11/621,817

(22) Filed: Jan. 10, 2007

(65) Prior Publication Data

US 2007/0244915 A1 Oct. 18, 2007

(30) Foreign Application Priority Data

Apr. 13, 2006 (KR) .................. 10-2006-0033659
Apr. 13, 2006 (KR) .................. 10-2006-0033661

(51) Int. Cl.
 *G06F 7/00* (2006.01)
 *G06F 17/30* (2006.01)
(52) U.S. Cl. ................ 707/739; 707/930; 707/937
(58) Field of Classification Search ........... 707/737, 707/739, 999.004, 930, 937
See application file for complete search history.

(56) References Cited

U.S. PATENT DOCUMENTS

| | | | | |
|---|---|---|---|---|
| 4,651,289 A * | 3/1987 | Maeda et al. | ......... | 704/244 |
| 5,442,778 A * | 8/1995 | Pedersen et al. | ......... | 1/1 |
| 5,754,840 A * | 5/1998 | Rivette et al. | ......... | 1/1 |
| 5,991,751 A * | 11/1999 | Rivette et al. | ......... | 1/1 |
| 6,055,540 A * | 4/2000 | Snow et al. | ......... | 1/1 |
| 6,098,066 A * | 8/2000 | Snow et al. | ......... | 1/1 |
| 6,185,550 B1 * | 2/2001 | Snow et al. | ......... | 1/1 |
| 6,671,683 B2 * | 12/2003 | Kanno | ......... | 1/1 |
| 6,694,331 B2 * | 2/2004 | Lee | ......... | 707/706 |
| 7,016,851 B1 * | 3/2006 | Lee | ......... | 705/310 |
| 7,225,181 B2 * | 5/2007 | Tsuda | ......... | 1/1 |
| 7,966,328 B2 * | 6/2011 | Germeraad et al. | ......... | 707/737 |
| 2002/0016787 A1 * | 2/2002 | Kanno | ......... | 707/5 |
| 2002/0178158 A1 * | 11/2002 | Kanno | ......... | 707/5 |
| 2003/0110181 A1 * | 6/2003 | Schuetze et al. | ......... | 707/103 R |
| 2004/0073443 A1 * | 4/2004 | Gabrick et al. | ......... | 705/1 |
| 2006/0101102 A1 * | 5/2006 | Su et al. | ......... | 707/205 |
| 2007/0078886 A1 * | 4/2007 | Rivette et al. | ......... | 707/102 |
| 2007/0208669 A1 * | 9/2007 | Rivette et al. | ......... | 705/59 |

OTHER PUBLICATIONS

Dik L. Lee et al., Document Ranking and the Vector-Space Model, Apr. 1997, IEEE, pp. 67-75.*
East Text Search Training Manual, Jan. 2000, pp. 1-157.*
U.S. Appl. No. 11/621,870 to Cha et al., which was filed on Jan. 10, 2007.
U.S. Appl. No. 11/621,820 to Cha et al.; which was filed on Jan. 10, 2007.

* cited by examiner

*Primary Examiner* — Mohammad Ali
*Assistant Examiner* — Patrick Darno
(74) *Attorney, Agent, or Firm* — McKenna Long & Aldridge LLP

(57) ABSTRACT

Provided are a system and method of clustering documents. The system includes a document DB, a document feature writing unit storing documents, a document retrieving unit, a clustering unit, and a cluster DB. The document DB stores documents. The document feature writing unit extracts attribute information of documents stored in the document database, and writes indexes with respect to the respective documents on the basis of the attribute information. The document retrieving unit retrieves documents including a query input by a user, using the indexes. The clustering unit includes a representative vector calculator calculating feature vectors and a representative vector of the retrieved documents, and a similarity calculator calculating similarities between the documents using the feature vectors and the representative vector. The cluster database stores documents clustered by the clustering unit.

18 Claims, 6 Drawing Sheets

FIG.2

Document 1 (35,19,15,13,.....,1) (A,B,C,D,......,M)

Document 2 (24,22,20,15,....,1) (B,C,A,D........I)

Document 3 (27,15,10,8,.....,1) (B,A,C,K,......D)

⋮   ⋮

Document 100 (33,21,15,15,....,1) (O,P,Q,C,......,Z)

FIG.3

| SELECT | No | Title | IPC | Appl.No. | Assignee | SIMILARITY(%) | | | |
|---|---|---|---|---|---|---|---|---|---|
| | | | | | | ABSTRACT | SPECIFICATION | CLAIM | WHOLE SPECIFICATION |
| ☒ | 1 | Optical beam reconfiguring device and optical | G02B_005/4 | 1996-614787 | SOL, Inc. (San | 57.09 | 57.21 | 57.93 | 58.16 |
| ☒ | 2 | Light deflecting device | G02B_026/08 | 1992-969397 | Crosfield Elect | 40.81 | 55.66 | 55.04 | 55.94 |
| ☒ | 3 | Method and apparatus for anamorphically sha | G02B_013/10 | 1965-759035 | Eastman Koda | 41.97 | 55.84 | 54.26 | 55.35 |
| ☒ | 4 | Polarization rotator with frequency shifting p | G01B_009/02 | 1993-083845 | Hughes Aircra | 41.57 | 53.81 | 54.30 | 52.20 |
| ☒ | 5 | Method and apparatus for anamorphically sha | G02B_013/10 | 1989-292720 | Verbatim Corp | 51.59 | 54.95 | 54.60 | 55.11 |
| ☒ | 6 | Passive error compensating device for optica | G02B_027/14 | 1977-824529 | The Perkin-Elr | 46.26 | 52.69 | 53.82 | 54.62 |
| ☒ | 7 | Thresholded, high power laser beam scannin | G02B_026/08 | 1992-890452 | Eastman Koda | 46.61 | 53.73 | 54.98 | 54.24 |
| ☒ | 8 | Optical beam expander for dye laser | H01S_00/02 | 1977-781146 | Molectron Cor | 19.24 | 55.22 | 53.76 | 54.12 |
| ☒ | 9 | Light beam-splitter | G02B_027/10 | 1983-561117 | Crosfield Elect | 41.73 | 52.98 | 49.17 | 53.84 |
| ☒ | 10 | Apparatus to transform a single laser beam in | G02B_027/14 | 1985-796331 | GTE Laborator | 55.18 | 48.77 | 51.84 | 52.76 |
| ☐ | 11 | Optical beam expander for dye laser | G02B_027/10 | 1974-469947 | Zygo Corporat | 45.89 | 49.58 | 52.93 | 52.21 |
| ☐ | 12 | | H01S_003/08 | 1976-676233 | Molectron Corj | | | | |
| ☐ | 13 | Achromatic anamorphic prism pair | G02B_005/04 | 1994-201652 | New Focus, Ir | 19.24 | 45.22 | 52.74 | 52.07 |

CLUSTER NUMBER: ☐ EA    DOCUMENT NUMBER PER CLUSTER: ☐ EA    CLUSTERING EXECUTION

FIG.4

Document 1 (35,19,15,13,....,1) (A,B,E,D,......,M)

Document 2 (24,22,20,15,....,1) (B,C,A,D,......,I)

Document 3 (27,15,10,8,....,1) (B,A,E,K,......O)

⋮  ⋮

Document 10 (33,21,15,15,....,1) (O,B,Q,C,......,Z)

FIG.5

Document 1 (1, 1, 1, 1)

Document 2 (1, 1, 0, 1)

Document 3 (1, 1, 1, 0)

⋮

Document 10 (0, 1, 0, 0)

SYSTEM AND METHOD FOR CLUSTERING DOCUMENTS

BACKGROUND OF THE INVENTION

1. Field of the Invention

The present invention relates to a system and method of clustering documents capable of determining a similarity between documents, and clustering similar documents on the basis of the determined similarity.

2. Description of the Related Art

Recently, a document retrieval system has been widely used, which processes countless document information, extracts information corresponding to user demand, and provides the extracted information to a user.

That is, document retrieval or information retrieval refers to searching for documents or information desired by a user from bulk documents or information. To retrieve documents or information, keyword processing is performed with respect to natural language texts, a weight is assigned to each keyword, and then retrieval and ordering are conducted.

The related art document retrieval system receives a query of a user, and outputs a common result extracted by a common system to the user. Here, a general retrieval system searches documents only on the basis of an area of the query received from the user, and thus it is difficult to provide the user with information characterized according to user's tastes and characters.

Also, since the related art retrieval system searches for information regarding just the query input by the user, a wrong retrieval range may be established. For this reason, information desired by the user and retrieval results show much difference, causing accuracy and reliability of retrieval results to degrade.

In addition, when receiving a query from a user, the related art document retrieval system performs an operation depending on a retrieval system used by sites providing information. Hence, accuracy of retrieved information is lowered, and it becomes difficult to provide information in real-time. However, in the case of documents that must be retrieved right after its generation or before a long time is elapsed after its generation, such as patent documents, a document accessing method and a search method characterized for a user are being required.

SUMMARY OF THE INVENTION

Accordingly, the present invention is directed to a system and a method of clustering documents that substantially obviate one or more problems due to limitations and disadvantages of the related art.

An object of the present invention is to provide a system and a method of clustering documents capable of providing a user with a correlation and a similarity between retrieved documents.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a system of clustering documents including: a document database storing documents; a document feature writing unit extracting attribute information of documents stored in the document database, and writing indexes with respect to the respective documents on the basis of the attribute information; a document retrieving unit retrieving documents including a query input by a user, using the indexes; a clustering unit comprising a representative vector calculator calculating feature vectors and a representative vector of the retrieved documents, and a similarity calculator calculating similarities between the documents using the feature vectors and the representative vector; and a cluster database storing documents clustered by the clustering unit.

In another object of the present invention, there is provided a method of clustering documents, including: extracting keywords from each of documents stored in a document database, and writing document indexes using the extracted keywords; selecting representative keywords constituting each of the documents, using the written document indexes; determining feature vectors of the documents using the representative keywords; determining a representative vector among the feature vectors to cluster retrieved documents; determining similarities between retrieved documents by calculation using the representative vector and the feature vector; and clustering the documents according to the similarities.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 2 is a view showing attribute information of each document;

FIG. 3 is a user interface of a document retrieval result;

FIG. 4 is a view showing index files based on keyword occurrence frequencies with respect to selected documents;

FIG. 5 is a view showing a feature vector calculated with respect to each of documents.

DETAILED DESCRIPTION OF THE INVENTION

Reference will now be made in detail to the preferred embodiments of the present invention, examples of which are illustrated in the accompanying drawings.

A system and method of clustering documents according to an embodiment of the present invention will now be described in detail with reference to accompanying drawings.

Figure 1:
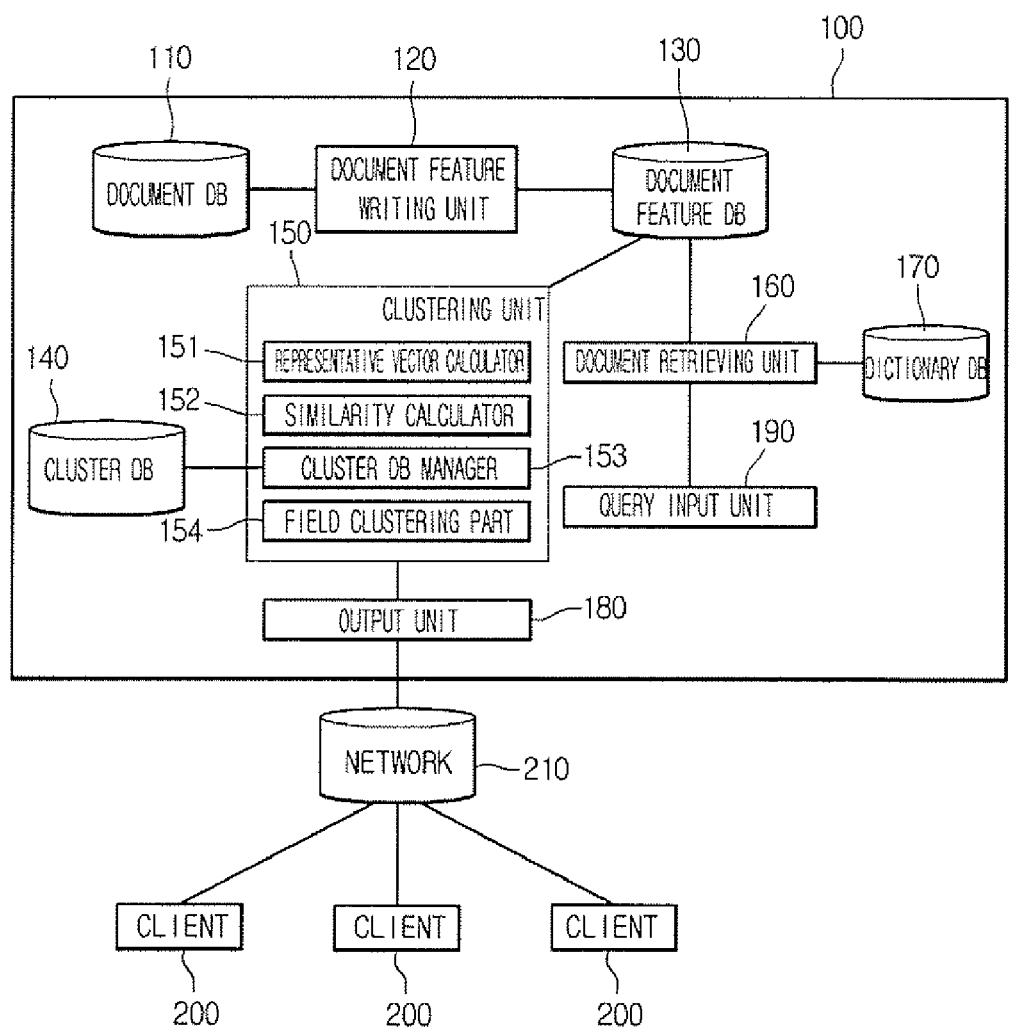
FIG. 1 is a block diagram illustrating a system of clustering documents according to an embodiment of the present invention.

FIG. 1 is a block diagram for describing a document clustering system according to an embodiment of the present invention.

Referring to FIG. 1, a document clustering system according to an embodiment of the present invention includes a client 200 to which a user inputs a query for document retrieval or a document retrieval result regarding the input query is displayed, and a clustering system 100 connected to the client 200 through a network 210 to perform the document retrieval of the query, and clustering retrieved documents.

The client 200 includes an input unit that a user uses to transmit a predetermined query to the clustering system 100, and an output unit receiving information of a document transmitted from the clustering system 100 and displaying the received information to the user.

Here, although the term 'clustering' is used in the clustering system 10, clustering of documents is not the only function of the clustering system 100. The clustering system 100 performs both retrieving of documents regarding a query input from the client 200, and clustering of the retrieved documents.

A communication medium between the clustering system 100 and the client 200 may be various communication networks 210 such as Internet, LAN, or the like.

The clustering system 100 extracts a keyword from an input query, retrieves documents using the extracted keyword, and clusters retrieved documents on the basis of a correlation or a similarity between the retrieved documents. The clustering system 100 includes a query input unit 190, a document retrieving unit 160, a document database (DB) 110, a document feature writing unit 120, a document feature DB 130, a cluster DB 140, a clustering unit 150, a document retrieving unit 160, and a dictionary DB 170.

The hardware configuration of the clustering system 100 is not specifically limited. For example, the clustering system 100 may be implemented as a computer including a central processing unit (CPU) or a memory device such as a ROM, a RAN, and a hard disk.

The term 'query' used in this disclosure refers to a text input for the purpose of selecting a part of a document from the document DB 110, the document feature DB 130, a cluster DS 140, and the dictionary DB 170, and includes a plurality of queries of logical expressions or natural languages.

Laid-open patent documents or registered patent documents are mainly stored in the document DB 110 of the present invention, but the present invention is not limited thereto. Hereinafter, the description will be made on the assumption that the laid-open patent documents or registered patent documents are stored in the document DB 110, each of which includes including fields of 'BACKGROUND OF THE INVENTION', 'SUMMARY OF THE INVENTION', 'DETAILED DESCRIPTION OF THE PREFERRED EMBODIMENTS' as identification items for distinguishing parts of the document from each other.

In the document DB 110, a plurality of patent documents are stored. Although not shown, patent documents can be acquired from another web server connected on the network by a web robot.

As for documents stored in the document DB 110, attribute information of the documents is extracted by the document feature writing unit 120, and indexes with respect to the documents are written on the basis of the attribute information.

That is, the document feature writing unit 120 acquires a text from the documents stored in the document DB 110, and supplies index information about an occurrence frequency of each keyword to the document feature DB 130. Here, the occurrence frequency of each keyword refers to the number of times each keyword appears in each document. When a predetermined query is input through the query input unit 190, the document retrieving unit 160 retrieves documents including the predetermined query using the index files of the individual documents stored in the document feature DB 130.

The documents retrieved by the document retrieving unit 160 are provided in the form of an interface illustrated in FIG. 3 to the client 200 through the output unit 180.

When a predetermined query is input through the query input unit 190 or a new document is provided to the document DB 110 by a web robot, the document feature writing unit 120 creates index files of corresponding documents, and determines a feature vectors for each of the documents, using the index files.

This will now be described with reference to FIG. 2.

FIG. 2 is a view showing attribute information of each document.

Attribute information of documents shown in FIG. 2 may be written in the form of index files by the document feature writing unit 120, and written index files are stored in the document feature DB 130.

The document feature writing unit 120 may determine a feature vector of each of the documents using the index files stored in the document feature DB 130, and the feature vector can also be stored in the document feature DB 130.

FIG. 2 illustrates information on occurrence frequencies of Keywords A, B, C, D, M, I, K, O, P, Q, and Z. For example, Document 1 includes keyword A 35 times, keyword B 19 times, keyword C 15 times, and keyword D 13 times. Herein, for example, the character 'A' of the keyword A does not indicate alphabet A, but indicates a word, which is a noun, a proper noun, or a compound noun.

A keyword occurrence frequency table included in each document may be created such that keywords are arranged sequentially in order of occurrence frequency from the highest to the lowest.

Although not shown in FIG. 2, percentages of the occurrence frequencies of the keywords in each document may be arranged in the table, instead of just the keyword occurrence frequencies.

For example, an index file of Document 1 may be created to include the meaning of (A, B, C D)→(4.5%, 2.4%, 1.9%, 1.7%) in order to indicate keyword A, keyword B, keyword C, and keyword D are included in Document 1 at 4.5%, 2.4%, 1.9% and 1.7%, respectively.

The index file of each document is created in various manners. Using the created index file, a feature vector of each document can be extracted.

In detail, the document feature writing unit 120 creates a table based on the occurrence frequency of each keyword in each document, and also creates a feature vector of each document using the table.

Here, the feature vector determined by the document feature writing unit 120 uses an evaluation value of each document as a component. For example, in the case where the total number of keywords of each document is n, a feature vector of each document may be expressed as a vector of an n-dimensional space as shown in expression 1 below:

$$\text{Feature vector} = (\text{evaluation value } w1 \text{ of keyword A, evaluation value } w2 \text{ of keyword B}, \ldots, \text{evaluation value } wn \text{ of keyword n}) \quad \text{(Equation 1)}$$

In order to calculate the evaluation values, a tf·idf scheme disclosed in a document 'Salton, G:Automatic Text Processing: The transformation, Analysis, and Retrieval of Information by Computer, Addison-Wesely' may be used. According to the tf·idf scheme, a value excluding zero is calculated as an evaluation value for a component, which corresponds to a keyword included in Document 1, of the n-dimensional feature vector corresponding to Document 1. Zero is calculated as an evaluation value for an component corresponding to a keyword which is not included in Document 1 (i.e., word occurrence frequency of which is zero).

In this respect, an evaluation value of a keyword as one component of a feature vector may be considered an occurrence frequency of each keyword in each document.

In the described above, the index file and the feature vector of each document created by the document feature writing unit 120 have been described. A configuration of a system of determining a representative vector of each document, and clustering retrieved documents, and a method thereof will now be described.

When a user inputs a predetermined query through the client 200, the document retrieving unit 160 displays to the client 200 a retrieval result list of documents including a corresponding query through the output unit 180, using index files stored in the document feature DB 130. Here, a user interface of the document retrieval result provided to the client 200 is illustrated in FIG. 3.

Referring to FIG. 3, a title (TITLE), an IPC (IPC), an application number (Appl. No.), assignees (Assignee), and a similarity (SIMILARLY) between documents may be displayed as a retrieval result. Here, the similarities of the documents are determined and output by each field identifying a part of the documents.

As described above, when documents stored in the document DB 110 are laid-open or registered patent documents, each document may include identification items such as 'Claims', 'ABSTRACT', 'BACKGROUND OF THE INVENTION', 'SUMMARY OF THE INVENTION', 'BRIEF DESCRIPTION OF THE DRAWINGS', and 'DETAILED DESCRIPTION OF THE PREFERRED EMBODIMENTS'. Those indication items may be defined as fields constituting the document, respectively.

Here, when a query input by a user is a mathematical combination of a plurality of words, the similarity of each field of the documents is based on occurrence frequencies of corresponding keywords in each field of the documents.

For example, the document retrieving unit 160 performs retrieval in units of field in each document of the document DB 110 with respect to a plurality of queries input by the user, and determines a similarity of a corresponding field on the basis of occurrence frequencies of the corresponding queries in each field.

As illustrated in FIG. 3, the output unit 180 of the clustering system 100 provides the client 200 with a list of documents acquired as a result of the retrieval. The output unit 180 includes a document selection part 310 allowing the user to individually select retrieved documents, and a clustering request part 320 for executing clustering of documents on the basis of the similarities of selected documents.

The user may set conditions of clustering performed on the selected documents. To this end, the client 200 is provided with a cluster number input part 330 through which the number of document clusters is input, and a document number input part 340 through which the number of documents per cluster is input.

Thus, a user may set the number of document clusters, and the number of documents per cluster through the cluster number input part 330 and the document number input part 340, as clustering conditions with respect to the selected documents.

Hereinafter, clustering of documents will be described by taking as an example the case where upper ten documents are selected through the document selecting part 310.

When the user selects ten documents from the list of retrieved documents provided to the client 200, index files of the ten selected documents are provided to the clustering unit 150 from the document feature DB 130.

A representative vector calculator 151 of the clustering unit 150 determines feature vectors of the respective selected documents from the index files, and calculates a representative vector needed for the clustering among those determined feature vectors. Here, it should not be considered by its name that calculating the representative vector is the only function of the representative vector calculator 151.

FIG. 4 shows index files based on keyword occurrence frequencies with respect to the selected documents, and particularly, Keywords A, B, E, D, M, I, K, O, Q, and Z are arranged in order of occurrence frequency from the highest to lowest.

Here, the representative vector calculator 151 can extract representative keywords having the highest frequencies among keywords in each document. For example, four keywords corresponding to four highest occurrence frequencies may be selected from the index file of each document.

In this case, Keyword A, Keyword B, Keyword E, and Keyword D may be selected in Document 1, and Keyword O, Keyword B, Keyword Q, and Keyword C may be selected in Document 10.

The representative vector calculator 151 can calculate percentages of occurrence frequencies of the respective selected keywords in each document. For example, the representative vector calculator 151 can calculate percentages of occurrence frequencies of individual keywords as follows: 4.5% of Keyword A 4.5%, 2.4% of Keyword B, 1.9% of Keyword C, and 1.7% of Keyword D.

In the aforementioned manner, the percentages of occurrence frequencies of the individual keywords with respect to each of the selected documents are calculated.

After this process is performed on those ten documents selected by the user, the percentages are added by each keyword with respect to the ten selected documents, and four specific keywords corresponding to four greatest values of values obtained by the adding operation are selected as representative keywords.

For example, when values obtained by adding the percentages by each keyword with respect to all the ten documents decrease in order of Keyword B, Keyword A, Keyword E, Keyword D, Keyword O, Keyword C, and Keyword K, Keyword B, Keyword A, Keyword E, and Keyword D may be chosen to be the representative keywords used in clustering of the selected documents.

The selected representative keywords are used as components of a representative vector, and thus feature vectors with respect to the respective documents are calculated.

That is, the selected representative keywords are arranged sequentially in order of occurrence frequency from the highest to lowest. Those representative keywords are chosen to be components of the representative vector.

The feature vector of each document is written on the basis of chosen Keywords B, A, E and D. Here, the four chosen keywords correspond to four highest occurrence frequencies from the index files of the documents. In the current embodiment, the four representative keywords are chosen to be the components of a representative vector, and feature vectors of the individual documents are written using the four keywords appearing at the highest frequencies in the documents. However, this is merely an example of the present invention, and can be changed freely by an administrator of the system.

The vector component is set to '1' when the selected representative keyword is included in a corresponding document, and the vector component is set to '0' if not. Instead of 1 and 0, values obtained by weighting the individual keywords may be written as the vector components.

Referring to FIG. 5, the feature vector of each document is completed by setting '1' when the representative keyword is included in the corresponding document, and setting '0' when the representative keyword is included therein.

The feature vector of Document 1 is determined as (1, 1, 1, 1) and the feature vector of Document 2 is determined as (1, 1, 0, 1) through the aforementioned process. Although the components of each feature vector is 1 or 0 in the current embodiment, different values may be assigned as the vector components according to the occurrence frequencies of the representative keywords.

A process of selecting a representative vector (or a center vector) is performed using the feature vectors of the documents. Here, a feature vector having the greatest magnitude of magnitudes of the feature vectors may be chosen to be the representative vector.

In this case, the feature vector (1, 1, 1, 1) of Document 1 may be chosen to be a representative vector of the feature vectors shown in FIG. 5. Similarities between the documents may be determined according to inner product values between the feature vector (hereinafter, referred to as a representative vector) of Document 1 and feature vectors of the documents.

In detail, the feature vectors may represent the respective corresponding documents, and a representative vector may be selected among such feature vectors in order to execute clustering according to the similarities of the documents.

Also, the similarity of each document may be calculated using inner product using the selected representative vector. For example, when a value obtained by inner product between the representative vector and the feature vector of Document 2 falls within a preset range, a document corresponding to the feature vector of Document 2 can be clustered together a document corresponding to the representative vector.

Assuming that a representative vector is referred to as representative vector A and a feature vector of a document that is to be compared with the representative vector A for the similarity determination is feature vector B, a similarity calculator 152 of the clustering unit 150 determines a similarity between a document corresponding to the representative vector A and a document corresponding to the feature vector B depending on a difference value between '1' and a value obtained by dividing an inner product value between the representative vector A and the feature vector B by $|A|^2$.

However, if a value obtained by inner productive between a representative vector and a feature vector of each document does not fall within the preset range, the document of the corresponding feature vector cannot be clustered together with the document of the representative vector, and is used as a document for another cluster.

That is, if a value obtained by inner product between the representative vector (feature vector of Document 1) and the feature vector of, for example, Document 2 falls within the preset range, Document 2 corresponding to the feature vector can be clustered with Document 1 corresponding to the representative vector, but if not, Document 2 is not clustered with Document 1.

As for documents which are not clustered with Document 1, a process of calculating another representative vector is performed. In this case, feature vectors of individual documents are calculated again in the same manner as illustrated in FIG. 5.

That is, the documents clustered with Document 1 may be classified into a first group. For other documents which are not classified into the first group, a process is performed as follows: representative keywords are selected from index files of the documents, feature vectors of the documents are selected using the selected representative keywords, a representative vector is chosen from the selected feature vectors, and similarities of the documents are determined using inner product values between the selected representative vector and the individual feature vectors of other documents.

A second group of documents is set through the aforementioned process, separately from the first group. The documents clustered by the clustering unit 150 are classified by each group and stored in the cluster DB 140.

In the current embodiment, feature vectors are extracted with respect to respective documents, a representative vector is chosen from the extracted feature vectors, and a value obtained by inner product between the selected representative vector and each of the feature vector is compared with a preset reference value, thereby classifying the documents. Therefore, clustering of similar documents can be made.

The clustering of the documents suggests that the following functions can be performed.

As illustrated in FIG. 3, the user may set the number of document clusters through the cluster number input unit 330, and may set a limitation on the number of documents per cluster through the document number input unit 340.

A value obtained by inner product between a representative vector and a feature vector of each document is compared with a reference value, and it is determined whether a document corresponding to the feature vector can be clustered together with a document corresponding to the representative vector. This fact suggests that a range of the number of documents to be clustered is determined depending on the reference value.

Representative vectors used to cluster a plurality of documents into groups are stored with the clustered documents in the cluster DB 140 by a cluster DB manager 153 of the clustering unit 150.

Since representative vectors used for clustering are stored, similarity determination of a new document can be made using the used representative vectors.

Here, representative keywords constituting components of the representative vector must be stored together with the representative vector.

As the documents are clustered, the user may select and study documents of a classified group. Accordingly, the user may be provided with more accurate information, not just mass amount of information.

In the above-described embodiment of the present invention, feature vectors of documents are extracted using index files written with respect to documents stored in the document DB 110, and a representative vector is selected and similarities of the documents are calculated using the extracted feature vectors. Hereinafter, automatic clustering of a new document stored in the document DB 110 will now be described below.

The clustering unit 150 according to the present invention includes the cluster DE manager 153 for managing clustered documents stored in the cluster DB 140. When a new document is stored in the document DB 110, the cluster DB manager 153 allows the new document to be automatically clustered by using a plurality of pre-selected representative vectors in the cluster DB 140.

The automatic clustering will now be described in more detail with reference to FIG. 6.

Figure 6:
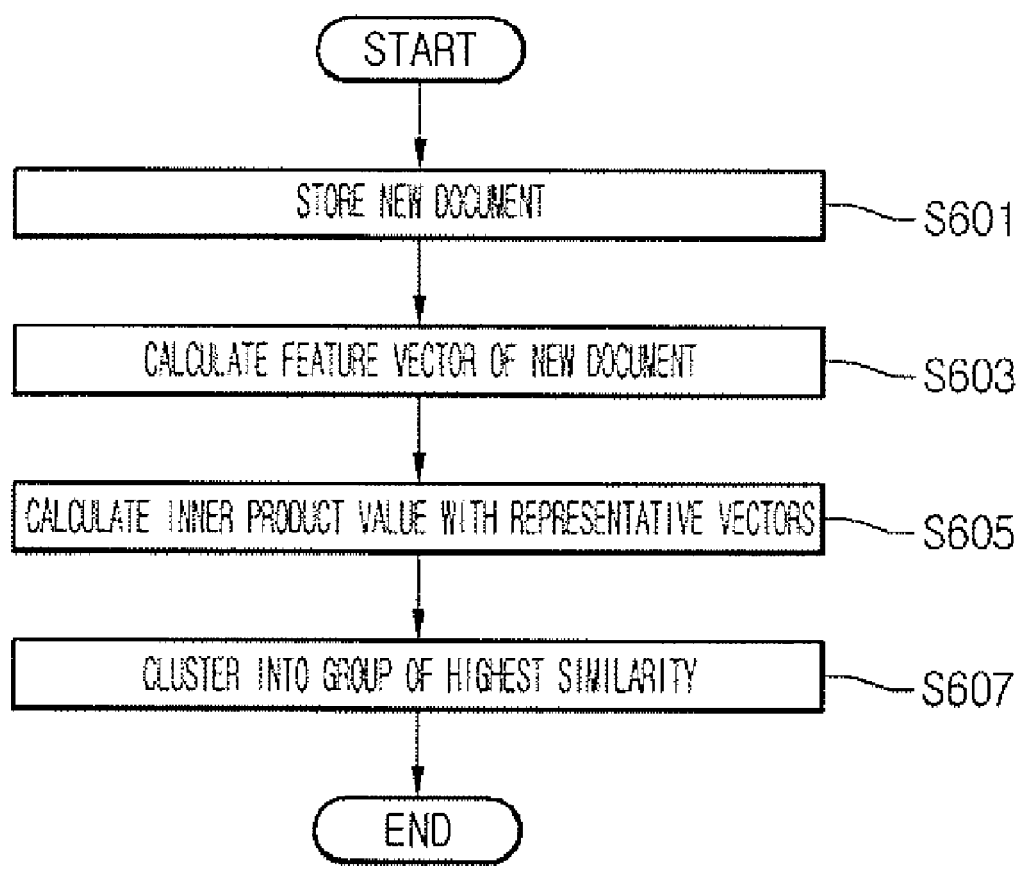
FIG. 6 is a flow chart of a method of automatically clustering a new document.

FIG. 6 is a flow chart of a method of automatically clustering a new document according to an embodiment of the present invention.

FIG. 6 shows a automatic clustering method when a new document is provided to the document DB 110 of the system by a web robot.

First, a new document is stored in the document DB 110 (S601), and an index file of the new document is written by the document feature writing unit 120.

The representative vector calculator 151 of the clustering unit 150 determines a feature vector with respect to the new document using the written index file (S603). Here, the number of components of the feature vector written by the representative vector calculator 151 is set to the preset number. In the previous embodiment of FIGS. 4 and 5, four vector components are set for a feature vector.

The similarity calculator 152 of the clustering unit 150 determines a similarity of the new document through an inner product value between a feature vector of the new document and the pre-stored representative vectors in the cluster DE 140 (S605).

That is, the representative vector calculator 151 determines the feature vector with respect to the new document from the index file thereof, and the cluster DE manager 153 determines the similarity between the documents through the inner product value between the determined feature vector of the new document, and the pre-stored representative vectors.

Here, as mentioned above, as a value obtained by dividing an inner product value between a representative vector A and a feature vector C of the new document by $|A|^2$ gets closer to '1', the similarity between the new document and the document corresponding to a representative vector A gets higher.

Accordingly, the cluster DB manager 153 may determine the similarity of the new document using a plurality of pre-stored representative vectors, and may cluster the new document to a group to which a document corresponding to a representative vector with the highest similarity belongs (S607).

Through the aforementioned processes, when a new document is provided to the document DB 110 by a web robot, the new document may be automatically clustered in the most similar group, without user's executing of the cluster operation.

In the previous embodiment, keywords are extracted from document, index files are written from the extracted keywords, and feature vectors and a representative vector are calculated using the written index files, and similarities between the documents are determined using the calculated vectors for clustering.

Also, index files with respect to specific fields of documents may be written, and thus documents with similar specific fields can be clustered together through the written index files.

The clustering unit 150 includes a field clustering part 154 for clustering documents depending on a similarity between fields, that is, identification items. The field clustering part 154 may cluster documents having the similar specific fields together.

That is, if documents used in the present invention are patent documents, the patent documents each include identification items such as 'Claims', 'ABSTRACT', 'BACKGROUND OF THE INVENTION', 'SUMMARY OF THE INVENTION', 'BRIEF DESCRIPTION OF THE DRAWINGS', and 'DETAILED DESCRIPTION OF THE PREFERRED EMBODIMENTS'. Here, the patent documents can be clustered depending on a specific identification item (or field).

Patents documents which are similar to each other in terms of fields of, for example, 'BACKGROUND OF THE INVENTION' and 'SUMMARY OF THE INVENTION' can be clustered together.

In this case, the document feature writing unit 120 extracts keywords from the fields of 'BACKGROUND OF THE INVENTION' and 'SUMMARY OF THE INVENTION' of the patent documents stored in the document DB 110, writes index files of the documents using the extracted keywords, and stores the index files in the document feature DB 130.

The representative vector calculator 151 of the clustering unit 150 selects feature vectors and a representative vector using occurrences frequencies of the keywords included in the fields of 'BACKGROUND OF THE INVENTION' and 'SUMMARY OF THE INVENTION' fields of the documents.

Thereafter, an inner product between the representative vector and the feature vector, and a similarity between the documents are determined with reference to the fields of 'BACKGROUND OF THE INVENTION' and 'SUMMARY OF THE INVENTION', using Accordingly, patent documents with similar fields may be clustered together. Thus, patent documents with similar related art problems may be clustered. Also, patent documents that are similar to each other in terms of the fields of 'BACKGROUND OF THE INVENTION' and 'SUMMARY OF THE INVENTION' may be clustered together.

The fact that documents can be clustered in units of specific field suggests that a new document can also be automatically clustered in units of specific field by the field clustering part 154.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A clustering device having software and hardware for clustering documents, the clustering device comprising:
  a document storage unit storing documents;
  a document retrieving unit to retrieve at least two selected documents form a plurality of documents stored in the document storage unit;
  a document feature writing unit to acquire text from at least one identical or similar specific field among a plurality of fields in each of the selected documents, and to create index files of the selected documents, and to determine a feature vector for each of the selected documents using the index files, wherein the feature vector includes occurrence frequencies of a plurality of keywords located in the specific field of the selected document;
  a representative vector calculator to extract representative keywords having highest occurrence frequencies among the plurality of keywords in the index file of selected the document, to calculate percentages of occurrence frequencies of each of the representative keywords in each selected document, to choose a group of keywords from the representative keywords of the selected documents to be representative keywords used in clustering of the documents, the representative keywords corresponding to a group of keywords having greatest values obtained by adding the percentage of occurrence frequencies among same keywords in each of the selected documents, wherein the representative keywords are chosen to be components of the representative vector;
  a cluster database storage unit to store representative keywords constituting components of the representative vector with the representative vector; and
  a clustering unit comprising:
    a similarity calculator to determine a similarity of the specific field of a stored document in the document storage unit through an inner product value between a feature vector of the stored document and stored representative vector in the cluster database storage unit;
receiving a stored document as a target document for clustering;
clustering the stored document using the specific field of the stored document through an inner product value between a feature vector of the stored document and stored representative vector in the cluster database storage unit; and
providing the user with a clustering result.

2. The clustering device according to claim 1, wherein the representative vector calculator sets a vector component of the feature vector to one if a part of an index of the stored document includes the representative keyword, and sets the vector component to zero if the part of the index does not include the representative keyword, so that the clustering unit generates the feature vector for the each stored document.

3. The clustering device according to claim 1, wherein the documents are patent documents, and
the clustering unit further comprises a field clustering unit clustering documents that are identical or similar to each other in the specific field defined in terms of an identification item in the patent document.

4. The clustering device according to claim 1, wherein the document storage unit stores a new document provided to the clustering device, and
when the new document is provided to the document storage unit, the clustering unit clusters the new document using the feature vector with respect to the new document and the representative vector stored in the cluster database.

5. The clustering device according to claim 4, wherein the clustering unit further comprises a cluster database manager managing clustered documents stored in the cluster database, and the representative vector used for clustering, and
the cluster database manager performs clustering of the new document.

6. The clustering device according to claim 1, wherein the clustering unit clusters the designated target documents among the plurality of documents in the document list when the clustering unit receives the document selection input from the user.

7. The clustering device according to claim 1, wherein the clustering unit generates the clustering groups whose number corresponds to the clustering group number input when the clustering unit receives the clustering group number input from the user.

8. The clustering device according to claim 1, wherein the clustering unit clusters the documents such that each clustering group has documents whose number corresponds to the document number input when the clustering unit receives the document number input from the user.

9. The clustering device according to claim 1, wherein the stored documents are documents acquired as a result of document retrieval.

10. A method for clustering documents, being employed in a clustering device that comprises a microprocessor, the method comprising:
retrieving at least two selected documents from a plurality of documents stored in a document storage unit;
acquiring, using the microprocessor, text from the at least one identical or similar specific field among a plurality of fields in each of the selected documents, and to create index files of the selected documents, and to determine a feature vector for each of the selected documents using the index files, wherein the feature vector includes occurrence frequencies of a plurality of keywords located in the specific field of the selected document;
extracting, using the microprocessor, representative keywords having highest occurrence frequencies among the plurality of keywords in the index file of the selected document, to calculate percentages of occurrence frequencies of each of the representative keywords in each selected document, to choose a group of keywords from the representative keywords of the selected documents to be representative keywords used in clustering of the documents, the representative keywords corresponding to a group of keywords having greatest values obtained by adding the percentage of occurrence frequencies among same keywords in each of the selected documents, wherein the representative keywords are chosen to be components of the representative vector;
storing, in a cluster database storage unit, representative keywords constituting components of the representative vector with the representative vector;
providing, using the microprocessor, a user with a document list which includes a plurality of documents;
receiving, using the microprocessor, a document selection input which designates target documents for clustering;
clustering, using the microprocessor, using identical or similar specific field of a document through an inner product value between a feature vector of the target document and stored representative vector in the clustering database storage unit.

11. The method according to claim 10, wherein the similarities are determined by comparing a preset reference value with a value obtained by dividing an inner product value between the representative vector and the feature vector by a square of an absolute value of the representative vector.

12. The method according to claim 10, wherein the clustering of the documents comprises storing representative vectors used for clustering of the documents.

13. The method according to claim 12, wherein when a new document is stored in the document storage unit, the feature vector with respect to the new document is calculated, and clustering of the new document is performed automatically using a value obtained by inner product between the pre-stored representative vectors and the feature vector of the new document.

14. The method according to claim 10, wherein the documents are patent documents, and the feature vector and the representative vector are calculated with respect to a specific field defined in terms of identification items of the patent documents.

15. The method according to claim 10, wherein the step of generating the feature vector comprises:
setting a vector component of the feature vector to one if a part of an index of a document includes the representative keyword; and
setting the vector component to zero if the part of the index does not include a representative keyword.

16. The method according to claim 10, wherein the step of clustering comprises:
clustering the designated target documents among the plurality of documents in the document list when the clustering device receives the document selection input from the user.

17. The method according to claim 10, wherein the step of clustering comprises:
generating the clustering groups whose number corresponds to the clustering group number input when the clustering device receives the clustering group number input from the user.

18. The method according to claim 10, wherein the step of clustering comprises:

clustering the documents such that each clustering group has documents whose number corresponds to the document number input when the clustering device receives the document number input from the user.

* * * * *